June 24, 1941. R. WEINLICH Re. 21,845

SWATCH

Original Filed Dec. 10, 1938 2 Sheets-Sheet 1

INVENTOR.
Rudolph Weinlich
BY
ATTORNEY.

June 24, 1941. R. WEINLICH Re. 21,845

SWATCH

Original Filed Dec. 10, 1938 2 Sheets-Sheet 2

INVENTOR.
Rudolph Weinlich
BY
ATTORNEY.

Reissued June 24, 1941

Re. 21,845

UNITED STATES PATENT OFFICE 21,845

SWATCH

Rudolph Weinlich, Brooklyn, N. Y.

Original No. 2,179,767, dated November 14, 1939, Serial No. 244,943, December 10, 1938. Application for reissue April 23, 1940, Serial No. 331,242

17 Claims. (Cl. 35—56)

This invention relates to cloth or textile fabric swatches, the object of the invention being to provide an improved cloth or textile fabric swatch which will disclose the different colors, combinations of colors, weights or textures of goods available in the pattern corresponding to the particular swatch, and which may readily be removed and replaced by others as the colors, etc., are changed, and which will be visible at all times, thereby avoiding the necessity of having a multitude of swatches corresponding to the various colors, weights and textures of each pattern, thus eliminating the necessity of cutting up many bolts of cloth to furnish such swatches.

Heretofore, in the selling of many classes of goods such, for instance, as men's suitings, by travelling salesmen and also in the shops, it has been the almost universal practice to display the same by means of samples of comparatively large size commonly called swatches since it is not always practicable even for a store, to carry large quantities of various patterns and kinds of material in the form of bolts of cloth. Consequently, since all goods usually come in different textures, weights, colors or combinations of colors, it was necessary to have a swatch of each weight and color, etc., to enable the customer to choose therefrom.

In short, if a particular pattern of cloth was made up in ten colors or combinations of colors and in several weights, etc., it was necessary to have for ten colors and three weights for each color, thirty or more swatches of that particular pattern and as each of these swatches was of considerable size and frequently of double thickness, obviously, many bolts of cloth were consumed in the manufacture of such swatches for the salesmen and the stock of the retailers, a very expensive procedure and which expense, of course, had to be added to the cost of the merchandise.

By the present improvement, the making of a swatch for each type or color of cloth is avoided and a single swatch of a particular pattern is provided accompanied by a set of small samples to show the various colors, textures and weights of cloth available and the swatch is so constructed that the samples are always visible and may be readily removed and others substituted when the colors and other details are changed.

Therefore, it is the object of the present improvement to reduce materially the expense and very much simplify the selling of the goods in a more expeditious manner.

In the drawings accompanying and forming a part of this specification,

Similar characters of reference indicate corresponding parts in the several views.

Figure 1:
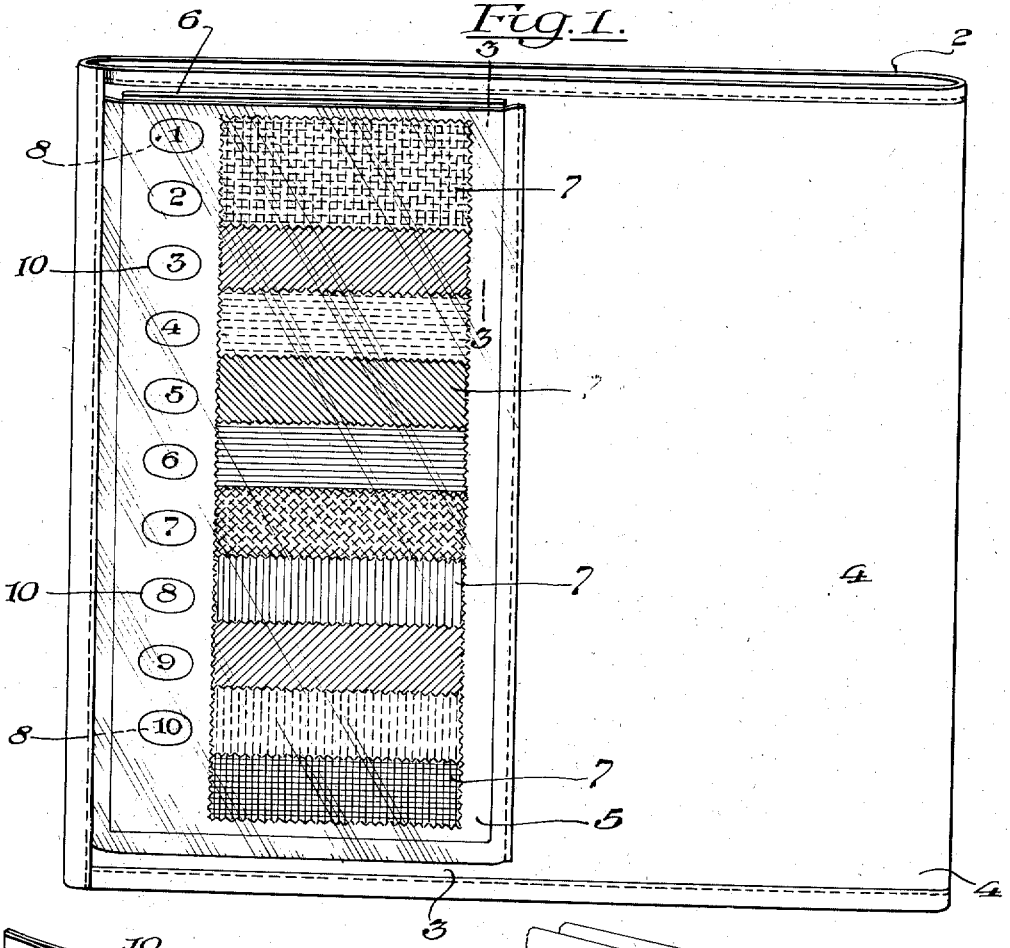
Fig. 1 illustrates a swatch having the present improvement.

Before explaining in detail the present improvement and mode of operation thereof, I desire to have it understood that the invention is not limited to the details of construction and arrangement of parts illustrated in the accompanying drawings since the invention is capable of other embodiments, and that the phraseology employed is for the purpose of description and not of limitation.

The swatch of material 2 usually having its edges pinked or bound and of either single or double thickness is provided with a covered portion 3, the area of which is usually less than the uncovered part 4 of the swatch and this covered portion consists of a transparent covering sheet of material 5 so stitched or bound to one face of the swatch that it will form a receptacle or pocket preferably open at its ends for the reception of a holder 6 comprising a card preferably of double thickness and connected along the edges and carrying a series of small samples 7 of different colors, grades or weights of the material, which samples are preferably so arranged on the holder as to overlap and also preferably carried by independent holders or strips 8 readily detachable from or attachable to the holder 6.

Figure 2:
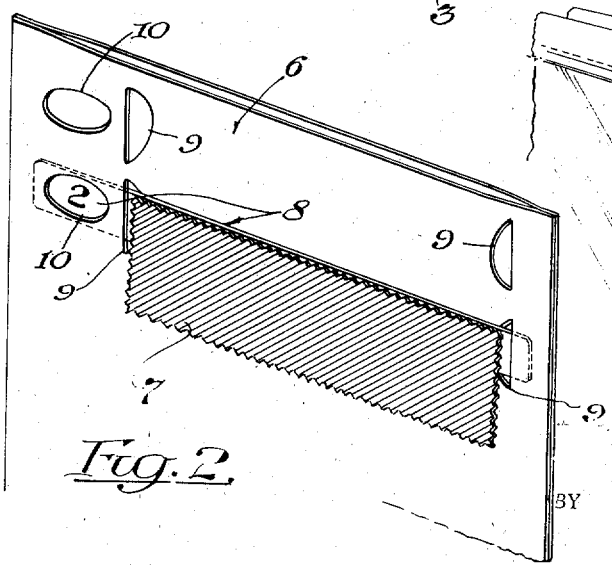
Fig. 2 is a perspective view of the detachable holder for the small samples or specimens.
Figure 3:
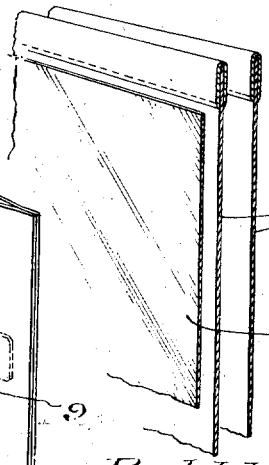
Fig. 3 is a transverse vertical section taken on the line 3—3 of Fig. 1, with the sample holder omitted.

In the form shown in Figs. 1 and 2, the receptacle of the swatch has a holder 6 therein carrying ten different colored specimens or samples 7, each mounted upon its own individual holder or strip 8, the ends of which are readily insertable into slots 9 located along the edges of the holder 6 so that the entire holder may be detached from the swatch and replaced by another or any one or more of the various colors may be detached from the holder and replaced by others.

The holder 6 is shown provided with sight openings 10 which permit data with relation to the various samples to be seen therethrough.

One of the advantages of this improved swatch is that the specimens may be easily handled without being soiled since they are protected by the transparent cover and thus maintained in a neat and clean condition while, at the same time, they are always visible.

Figure 4:
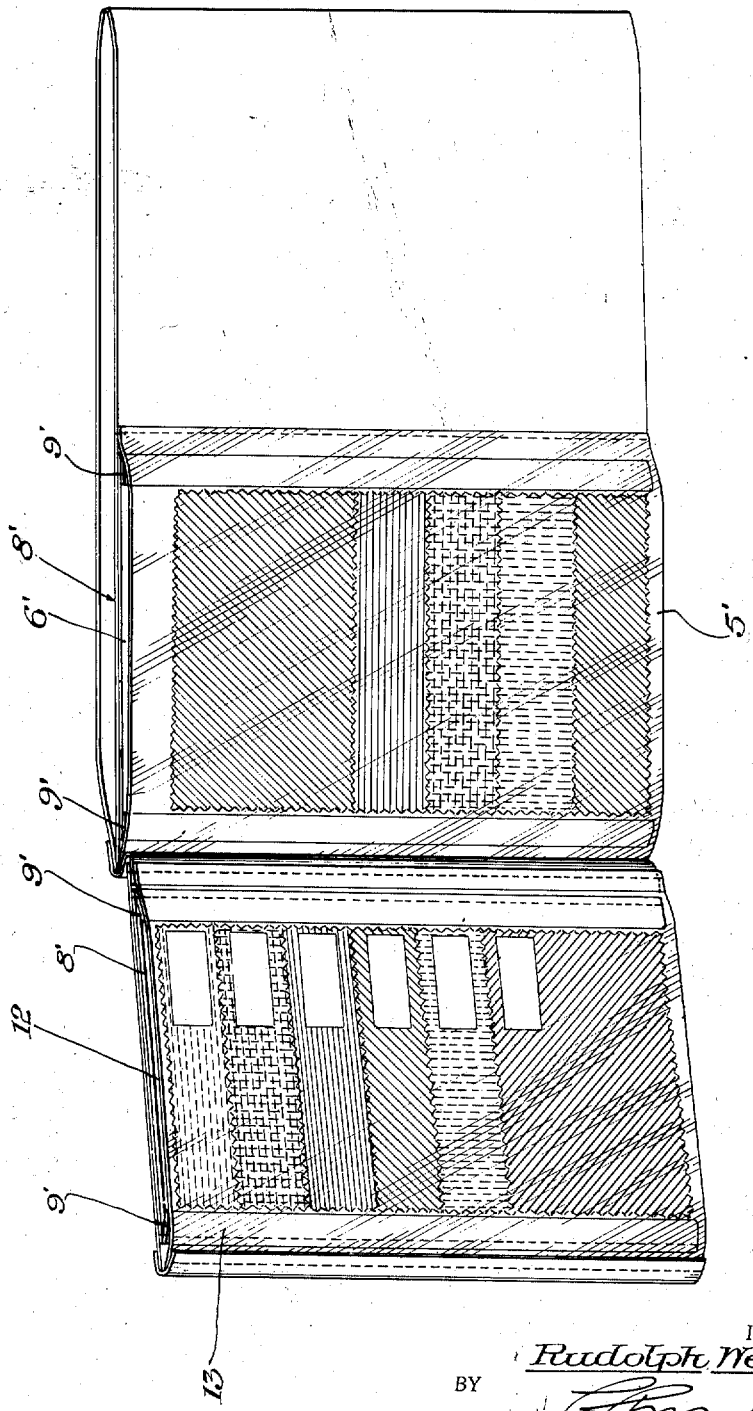
Fig. 4 is a perspective view of a swatch arranged to carry several sets of samples and preferably arranged in book form so that the book may contain one or more additional leaves of samples.

If desired, several holders may be carried in receptacles, each having a transparent face secured to the swatch side by side, one form of which is shown in Fig. 4 wherein the swatch is arranged in book form so that a greater number of samples may be carried by the same swatch and for this purpose, the swatch has one face thereof provided with a transparent covering sheet 5' secured thereto preferably by being stitched along its edges crosswise of the swatch and shown extending substantially from edge to edge thereof, as in Fig. 1, thus providing a receptacle for a removable holder 6' which, in this form, has overlapping side edges 9' for the reception of individual holders 8' carrying the different samples, whereby each may be readily removed from the holder.

Secured to one end of the swatch, preferably by being bound thereto to form a hinge, is a leaf-formed receptacle 12 likewise having a transparent covering sheet 13 for the reception of a main holder similar to either of those hereinbefore described and, therefore, adapted to carry individual sample holders 8' located side by side, preferably cross-wise of the swatch so that the swatch may be readily folded into compact book form.

From the foregoing, it will be seen that this swatch or sample holder 2 thus comprises a mounting sheet or holder 6 on which a plurality of smaller swatches are mounted or secured, and that this swatch, forming a part of the holder 2, comprises, as hereinbefore stated, a covered portion 3, the area of which is usually less than that of the uncovered part 4 so that the part 4 is at least substantially the area of said sheet or holder 6, being shown as substantially twice the size of the covered part 3 or the mounting sheet or holder 6 so that one-half of the swatch sample 2 may completely cover the back of the sheet 6 while the remaining half 4 may be folded over the front of the sheet 6 to which the smaller swatches are secured and since a transparent cover 5 is stitched or bound to the swatch, it combines therewith to form a pocket for receiving the mounting sheet or holder 6, while in Fig. 4, a cover section 12 of substantially the same size as the sheet 6 or covered portion 3 is hinged in any suitable way to the sample holder or swatch 2 for movement to open and closed positions and includes a transparent material or sheet 13 forming a pocket for the reception and exposure of a plurality of swatches, or a mounting sheet or holder 6' similar to that hereinbefore referred to, whereby the swatches may be removed from said pocket when desired, more closely to inspect the swatches carried thereby.

In short, the gist of this improvement resides, in part, in an improved swatch or sample carrier made wholly of the swatch material and secured thereto a supporting means or mounting sheet having thereon or secured thereto a set of smaller swatches of the same pattern but of different weights or colors, the swatch being of sufficient size so that at least substantially one-half of the swatch is foldable over the smaller swatches.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. A relatively large swatch of cloth or textile fabric of sufficient size to drape over the arm or leg and having on a face thereof a pocket of materially less size than the swatch and having therein a removable supporting holder carrying in juxtaposition for ready comparison with each other and with the larger swatch, a set of smaller swatches of the same pattern but of different weights or colors whereby a single large swatch with its associated small swatches will take the place of many large swatches.

2. A relatively large foldable swatch of cloth or textile fabric of sufficient size to drape over the arm or leg and having on a face thereof a transparent-faced pocket of materially less size than the swatch and having therein a removable supporting holder carrying in juxtaposition for ready comparison with each other and with the larger swatch a set of smaller swatches of the same pattern but of different weights or colors whereby a single large swatch with its associated smaller swatches will take the place of many large swatches.

3. A relatively large foldable swatch of cloth or textile fabric of sufficient size to drape over the arm or leg and having on a face thereof a transparent-faced pocket of materially less size than the swatch and having therein in removable supporting holder carrying in juxtaposition for ready comparison with each other and with the larger swatch a set of smaller swatches of the same pattern but of different weights or colors, and independent holders removable with or from said supporting holder and each carrying one of the smaller swatches, whereby a single large swatch with its associated smaller swatches will take the place of many large swatches.

4. A relatively large foldable swatch of cloth or textile fabric of sufficient size to drape over the arm or leg and having on a face thereof a transparent-faced pocket of materially less size than the swatch and having therein a removable supporting holder carrying in juxtaposition for ready comparison with each other and with the larger swatch a set of smaller swatches of the same pattern but of different weights or colors, and independent holders removable with or from said supporting holder and each carrying one of the smaller swatches, said supporting holder having a row of aligned slots for the reception of independent swatch holders carrying the smaller swatches and adjacent thereto a row of sight openings, whereby a single large swatch with its associated smaller swatches will take the place of many large swatches.

5. A relatively large swatch of cloth or textile fabric comprising a pair of layers of material folded upon itself and of sufficient size to drape over the arm or leg and having on the face thereof a transparent-faced pocket of materially less size than the swatch and having therein a removable supporting holder carrying in juxtaposition for ready comparison with each other and with the larger swatch a set of smaller swatches of the same pattern but of different weights or colors whereby a single large swatch with its associated smaller swatches will take the place of many large swatches.

6. A relatively large swatch of cloth or textile fabric of sufficient size to drape over the arm or leg and having on a face thereof a pocket of materially less size than the swatch and having therein a removable supporting holder carrying in juxtaposition for ready comparison with each other and with the larger swatch a set of smaller swatches of the same pattern but of different weights or colors, said large swatch having a leaf secured to one edge thereof and also carrying a pocket having therein a removable supporting holder carrying in juxtaposition for ready comparison with each other and with the larger swatch a set of smaller swatches of the same pattern but of different weights or colors, whereby a single large swatch with its associated smaller swatches will take the place of many large swatches.

7. A relatively large foldable swatch of cloth or textile fabric of sufficient size to drape over the arm or leg and having on a face thereof a transparent-faced pocket of materially less size than the swatch and having therein a removable supporting holder carrying in juxtaposition for ready comparison with each other and with the larger swatch a set of smaller swatches of the same pattern but of different weights or colors, said swatch having a leaf secured to one edge thereof and also carrying a transparent-faced pocket of substantially the same size as the first pocket and having therein a removable supporting holder carrying in juxtaposition for ready comparison with each other and with the larger swatch a set of smaller swatches of the same pattern but of different weights or colors, whereby a single large swatch with its associated smaller swatches will take the place of many large swatches.

8. A relatively large foldable swatch of cloth or textile fabric of sufficient size to drape over the arm or leg and having on a face thereof a transparent-faced pocket of materially less size than the swatch and having therein a removable supporting holder carrying in juxtaposition for ready comparison with each other and with the larger swatch a set of smaller swatches of the same pattern but of different weights or colors, said swatch having a leaf secured to one edge thereof and also carrying a transparent-faced pocket of substantially the same size as the first pocket and having therein a removable supporting holder carrying in juxtaposition for ready comparison with each other and with the larger swatch a set of smaller swatches of the same pattern but of different weights or colors and independent holders removable with or from the supporting holder and each carrying one of the smaller swatches, whereby a single large swatch with its associated smaller swatches will take the place of many large swatches.

9. A relatively large swatch of cloth or textile fabric comprising a pair of layers of material folded upon itself and of sufficient size to drape over the arm or leg and having on a face thereof a transparent-faced pocket of materially less size than the swatch and having therein a removable supporting holder carrying in juxtaposition for ready comparison with each other and with the larger swatch a set of smaller swatches of the same pattern but of different weights or colors, said swatch having a leaf secured to an edge thereof and also having a transparent-faced pocket having therein a removable supporting holder carrying in juxtaposition for ready comparison with each other and with the larger swatch a set of smaller swatches of the same pattern but of different weights or colors, and an independent holder removable with or from the main holder and each carrying one of the smaller swatches, whereby a single large swatch with its associated smaller swatches will take the place of many large swatches.

10. A relatively large foldable swatch of cloth or textile fabric comprising a pair of layers of material folded upon itself and of sufficient size to drape over the arm or leg and having on a face thereof a transparent-faced pocket not exceeding substantially one-half the size of the foldable swatch and having therein a removable supporting holder carrying in overlapping relation for ready comparison with each other and with the larger swatch a considerable number of smaller swatches of the same pattern but of different weights or colors and an independent holder removable from or with the main holder and each carrying one of said smaller swatches whereby a single large swatch with its associated smaller swatches will take the place of many large swatches.

11. A relatively large foldable swatch of cloth or textile fabric comprising a pair of layers of material folded upon itself and of sufficient size to drape over the arm or leg and having on a face thereof a transparent-faced pocket not exceeding substantially one-half the size of the foldable swatch and having therein a removable supporting holder carrying in overlapping relation for ready comparison with each other and with the larger swatch a considerable number of smaller swatches of the same pattern but of different weights or colors, and an independent holder removable from or with the main holder and each carrying one of said smaller swatches, said large swatch having secured to one edge thereof a leaf of substantially the same size as the transparent pocket of the large swatch and also having a transparent pocket, a removable supporting holder therein carrying in overlapping relation for ready comparison with each other and with the larger swatch a considerable number of smaller swatches of the same pattern but of different weights or colors and an independent holder removable with or from the main holder and each carrying one of the smaller swatches whereby a single large swatch with its associated smaller swatches will take the place of many large swatches.

12. A sample holder comprising a mounting sheet having secured thereto a plurality of fabric swatches of like quality and each of different design, and a sample forming a part of said holder and extending beyond an edge thereof and being of greater area than the combined area of said swatches and of the same quality, said sample being foldable from said edge to constitute a cover for said swatches.

13. A sample holder comprising a mounting sheet having secured thereto a plurality of fabric swatches of like quality, a quality sample of at least substantially the area of said sheet secured to and covering the back of the latter and foldable over the swatches thereon, and a cover for said holder hingedly connected to a part of said holder.

14. A sample holder comprising a mounting sheet having secured thereto a plurality of fabric swatches of like quality, a quality sample of at least substantially the area of said sheet secured to the latter and foldable over the swatches thereon, and a transparent cover for said holder hingedly connected to a part of said holder.

15. A sample holder comprising a mounting sheet having secured thereto a plurality of swatches of like quality, a quality sample of substantially twice the area of said sheet and constituting a backing and a covering therefor, and a transparent sheet secured to a portion of said sample so as to combine therewith to form a pocket for receiving said mounting sheet.

16. A relatively large foldable swatch of cloth or textile fabric of sufficient size to drape over the arm or leg and having on a face thereof, and of materially less size than the swatch, a supporting means or mounting sheet carrying in juxtaposition for ready comparison with each other and with the larger swatch a set of smaller swatches of the same pattern as the foldable swatch but of different weights or colors whereby a single large swatch with its associated smaller swatches will take the place of many large swatches, the foldable swatch corresponding with the pattern of the smaller swatches and extending therebeyond and foldable thereover to form a cover therefor.

17. The article of claim 16 characterized by having another cover hinged thereto to protect the foldable swatch cover.

RUDOLPH WEINLICH.